Nov. 7, 1933.  J. BREWER  1,933,584
WINDOW SCREEN
Filed Nov. 28, 1931  4 Sheets-Sheet 1

WITNESSES

INVENTOR
Joseph Brewer
BY
ATTORNEYS

Nov. 7, 1933.  J. BREWER  1,933,584
WINDOW SCREEN
Filed Nov. 28, 1931  4 Sheets-Sheet 2
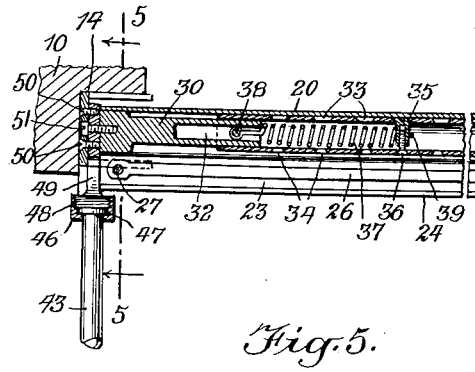
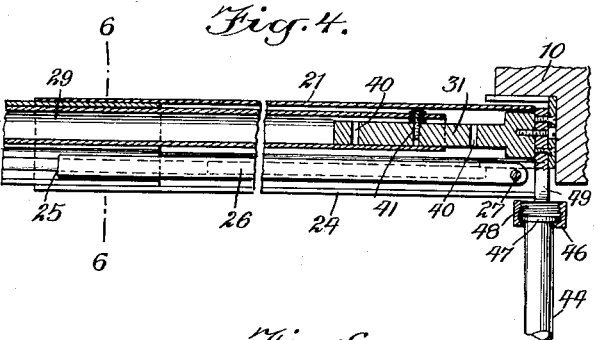
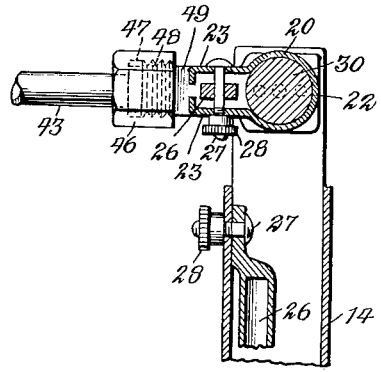
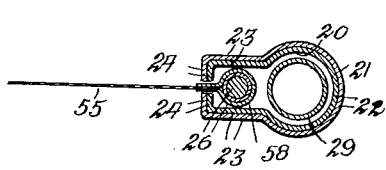
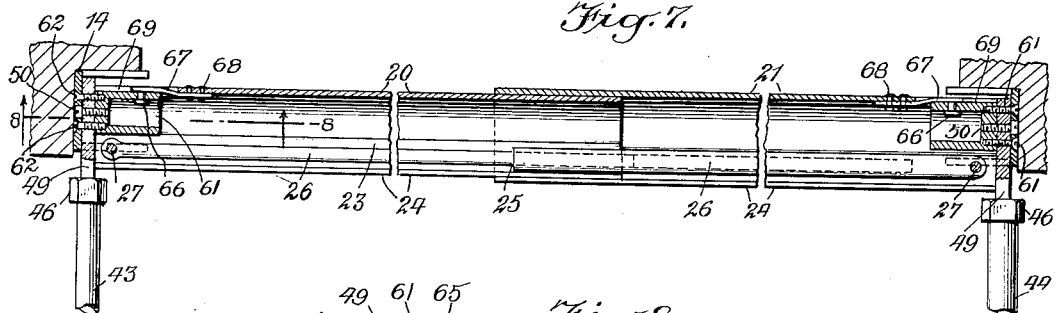
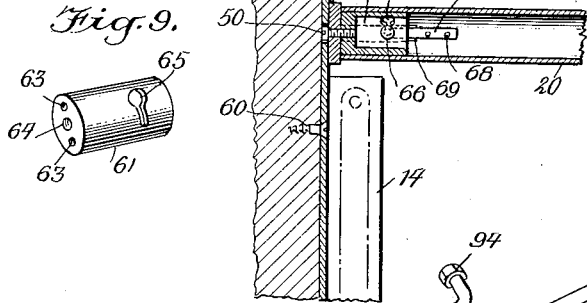
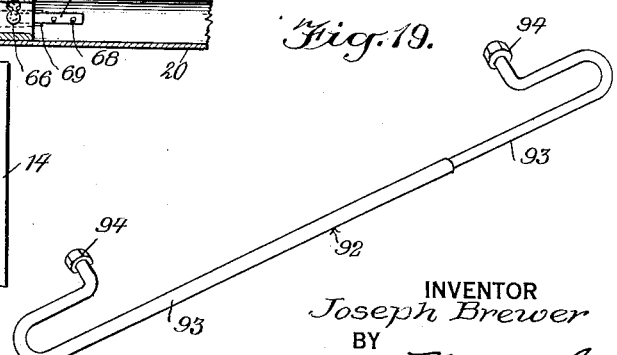
WITNESSES
Geo. W. Naylor
Chris Feinle
INVENTOR
Joseph Brewer
BY
Munn & Co.
ATTORNEYS Nov. 7, 1933.  J. BREWER  1,933,584
WINDOW SCREEN
Filed Nov. 28, 1931  4 Sheets-Sheet 3
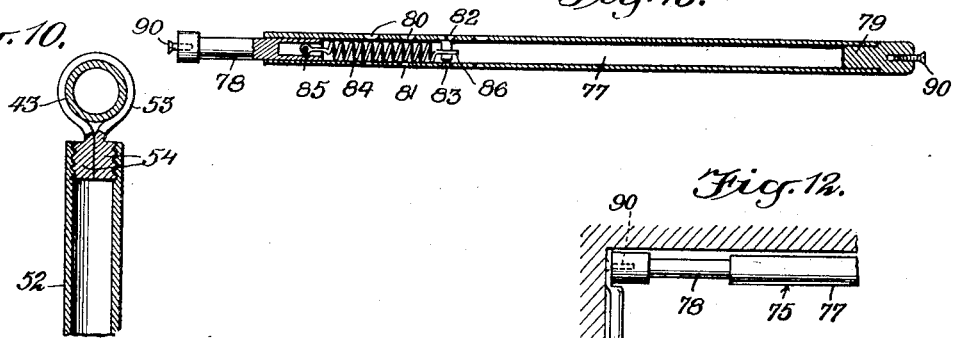
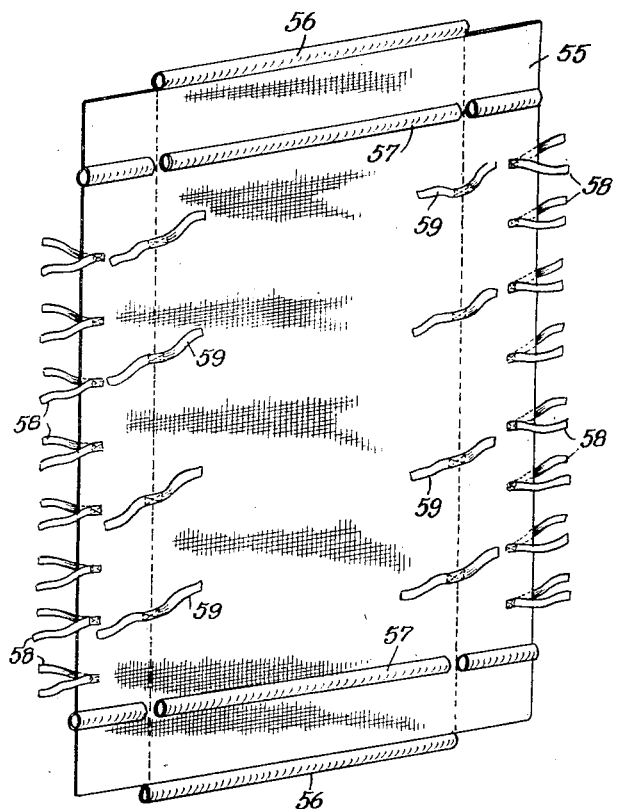
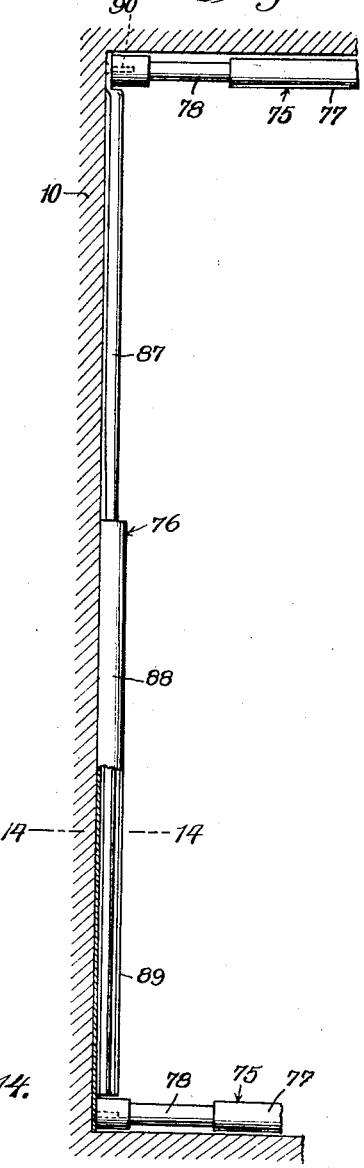
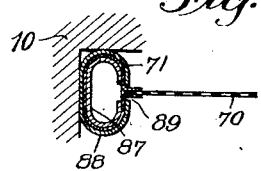
WITNESSES
INVENTOR
Joseph Brewer
BY
ATTORNEYS Nov. 7, 1933.                J. BREWER                1,933,584
                            WINDOW SCREEN
                         Filed Nov. 28, 1931        4 Sheets-Sheet 4
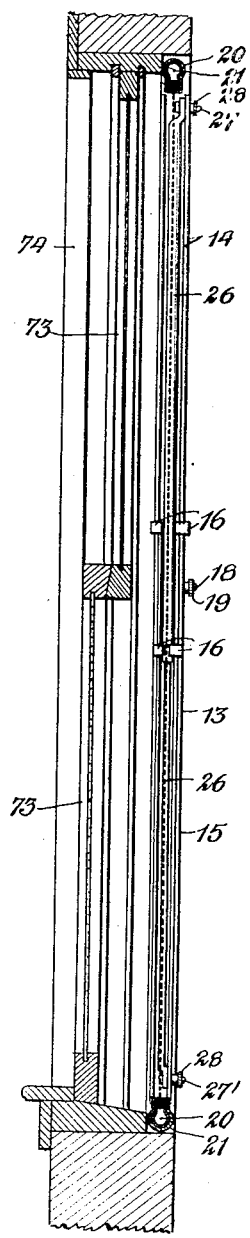
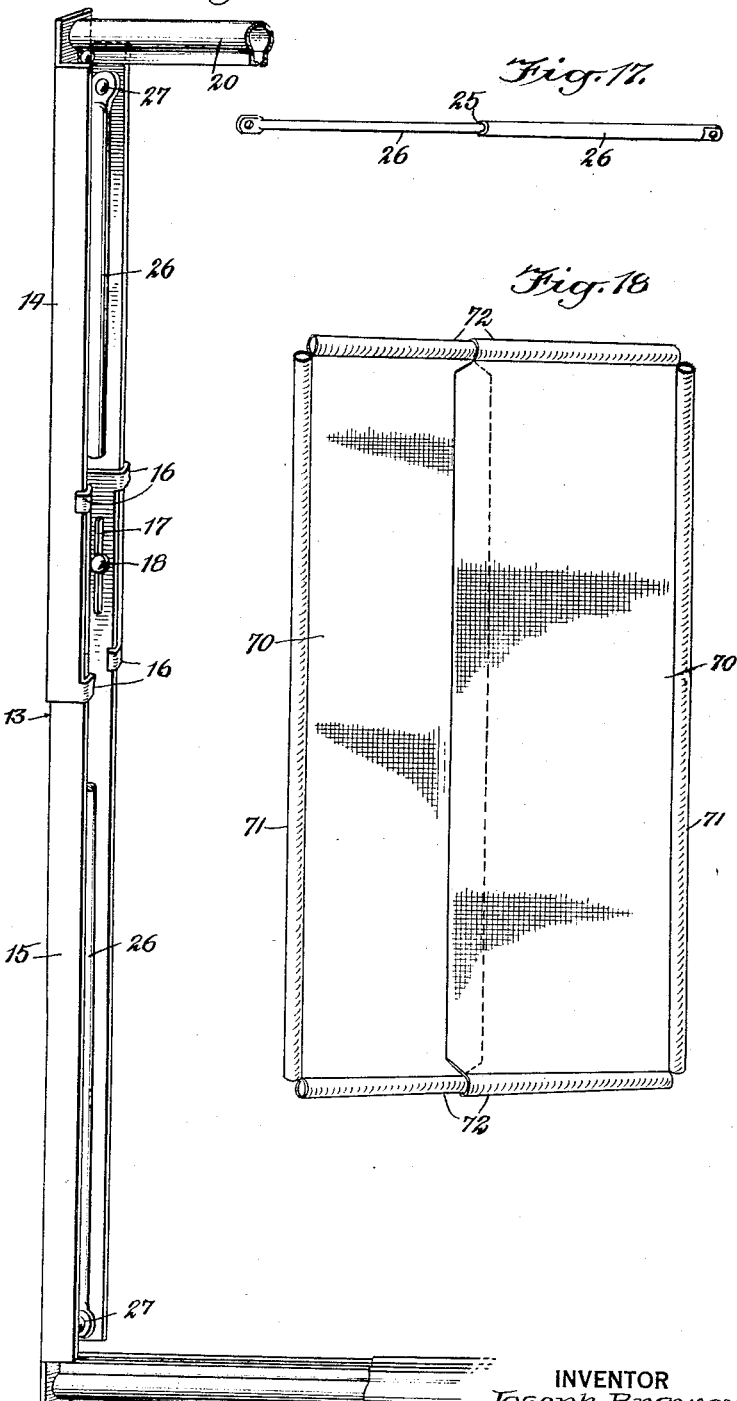
INVENTOR
Joseph Brewer
BY
ATTORNEYS
WITNESSES Patented Nov. 7, 1933

1,933,584

UNITED STATES PATENT OFFICE 1,933,584

WINDOW SCREEN

Joseph Brewer, New York, N. Y.

Application November 28, 1931
Serial No. 577,833

18 Claims. (Cl. 156—38)

This invention relates to a screen for general application to either the inside or outside of frame structures surrounding ventilating openings, and which may be applied advantageously to windows.

One object of this invention is to provide a window screen and/or ventilator, wherein the frame and the screening or ventilating material may be readily separated for cleaning, repairing, or replacement.

Another object is to provide a screen which is adapted for use in conjunction with windows having swinging sashes.

A further object is to provide an extremely simple means for separating the screen from its frame, without removing the said frame from its position adjacent the window.

An additional object is to provide a screen that may be attached in relation to practically any window opening either in a readily removable manner without the use of tools or external means of any kind, or, if desired, permanently by the use of such simple means as a few screws, pins, etc.

A still further object is to provide a screen frame that can be adjusted to fit different size window openings.

With the foregoing and other objects in view the invention resides in the particular provision, construction and relative disposition of the parts hereinafter described and illustrated in the accompanying drawings, in which Figure 1 is a front view showing a screen constructed in accordance with the invention applied to the outside of the frame of a window having swinging sashes, a portion only of the screening or filling material being shown and a portion of the screen frame structure being broken away;

Figure 4 is an enlarged section through the top of the base frame and associated parts, portions being broken;

Figure 5 is a section on the line 5—5 of Figure 4;

Figure 6 is a section on the line 6—6 of Figure 4;

Figure 7 is a view similar to Figure 4 but showing means for modifying the construction shown in Figure 4;

Figure 8 is a section on the line 8—8 of Figure 7;

Figure 9 is a perspective of part of the means for securing one of the top frame members with one of the side frame members;

Figure 10 is a detail section of one of the ends of the braces of the screen;

Figure 11 is a view of the screen or filling material and securing means detached;

Figure 12 is a section showing a modified form of screen frame;

Figure 13 is a longitudinal section through the top and bottom member assemblages of the frame shown in Figure 12;

Figure 14 is an enlarged section on the line 14—14 of Figure 12;

Figure 15 is a vertical section of a modification of the screen shown in Figures 1-3 applied to a window frame having slidable sashes;

Figure 16 is a fragmentary perspective view of the frame of the screen shown in Figure 15;

Figure 17 is a view of one of the adjustable rods with which the screening material is connected;

Figure 18 is a view of the screening or filling material used with the frame of the screen shown in Figure 15;

Figure 19 is a perspective view of a support adapted for use in conjunction with the frame structure shown in Figure 1.

Figures 1, 2, 3:
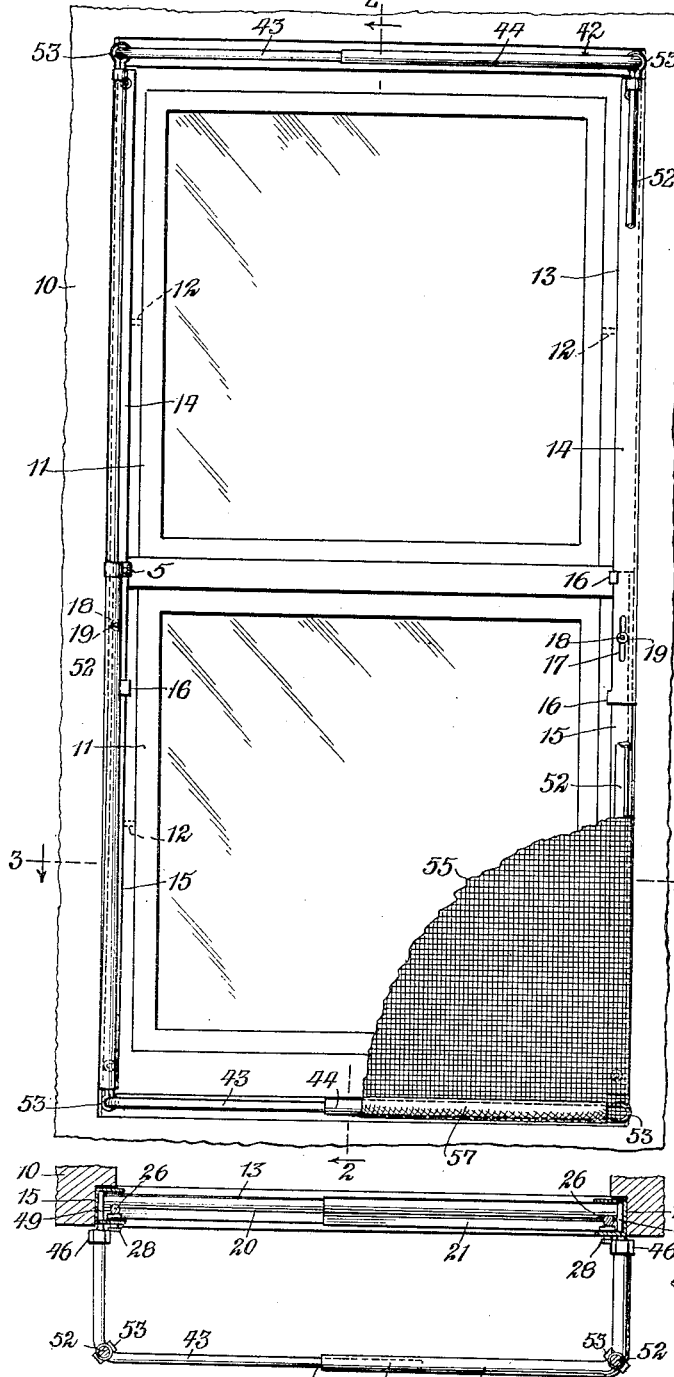
Figure 2 is a vertical section on the line 2—2 of Figure 1.
Figure 3 is a horizontal section on the line 3—3 of Figure 1.

The screen shown most clearly in Figures 1 to 4, inclusive, is designed and adapted to be used in conjunction with a window frame 10 having sashes 11 to swing on horizontal axes designated 12. The screen includes a base frame structure or assembly 13 to be positioned preferably, but not necessarily, within the window frame opening. The frame structure 13 consists of side or vertical members, and top and bottom members connected together in a rectangular formation. Each of the side or vertical members consists of a plurality of channel sections 14 and 15 which are slidably held together by clips or the like 16 integral with each section and engageable with the other section. The sections 14 and 15 are provided respectively with longitudinal slots 17 which accommodate a suitable fastening or clamping means such as the screw bolt 18 and thumb nut 19 for the bolt. It will be apparent that the sections 14 and 15 are longitudinally adjustable to increase or decrease the length of the side member, and the bolt 18 and nut 19 retain the sections 14 and 15 in the adjusted relation. The top and bottom or horizontal frame members each consist of hollow or tubiform sections 20 and 21 of flexible metal. Each section 20 and 21 is of similar cross section and consists of a circular portion 22, having integral flanges 23 extending throughout the length of the portion 22, and inturned edges 24 integral with the flanges 23. The sections 20 and 21 are telescopically associated with each other so as to be adjustable longitudinally to increase or decrease the length thereof. Use is made of rods 25, there being one for each of the side members of the frame and also the top and bottom members of the frame. The said rods 25 are arranged respectively within the frame members, and the sections 26 of the rods are transversely secured at the ends to the sections of the related frame members. Each rod end section 26 is secured by a bolt 27 and thumb nut 28 screwed on the bolt, as shown most clearly in Figure 5. Means is provided for securing the base frame assembly 13 in place without the use of any tools or other fastening means applied to the window frame in order to hold the screen in place. The said means consists of a similar assemblage of parts arranged within both the top frame member and the bottom frame member and which is shown most clearly in Figure 4. The said retaining means consists of an intermediate tubular member 29 and end members 30 and 31 slidably received respectively in the opposite ends of the member 29. The member 30 is of hollow construction for a portion of its length as at 32. The member 29 has series of holes 33 and 34 respectively which are arranged diametrically opposite each other, pairs of holes 33 and 34 being in axial alinement with each other. A screw or the like 35 may be arranged in either one of the holes 33 and a screw or the like 36 of smaller diameter may be arranged in either one of the holes 34. The screws 35 and 36 are adapted for threading engagement with each other. Use is made of an expansion coil spring 37 having one of its ends connected as at 38 with the member 30, the said end being entered in the hollow portion 32 and the opposite end of the spring being connected by a loop 39 to the screw 35. The end member 31 has a plurality of holes 40 therein each of which may accommodate a screw or the like 41 swivelly connected with the member 29. This affords provision for increasing or decreasing the length of the retaining means when it is desired to vary the width of the base frame assembly 13. It will also be apparent that by the provision of the holes 33 and 34 and the screws 35 and 36 the tension of the spring 37 may be varied to compensate for variations made as to the width of the base frame.

A frame structure 42 is used in conjunction with the base frame structure or assembly 13 and forms therewith a box-like formation. The said structure 42 consists of upper and lower members of similar construction each consisting of L-shaped sections 43 and 44 which are telescopically associated with each other as at 45. Each of the sections 43 and 44 has a nut 46 which is turnable thereon and also axially movable, the same being limited in its axial movement in one direction by a shoulder 47. The nut 46 screws on a threaded end 48 of a coupling member 49. It will now be understood that use is made of four members 49, two of which are secured respectively to the upper and lower ends of the sections 14 and 15 of each of the side members of the base frame 13. This is accomplished by the use of screws or other fastening elements 50. The left-hand members 49 are also secured respectively to the members 30 by a screw or the like 51, and the right-hand members 49 are also secured respectively to the members 31 by a similar screw 51. The screws 51 serve to connect the top and bottom members of the base frame 13 with the side members thereof. The screws 50 serve to secure the frame structure 42 to the base frame 13. It is apparent that a similar retaining means is arranged within and housed by the circular portions of the top and bottom members of the frame structure 13. The springs 37 of the retaining means serve to exert an outward pressure or force to retain the side members of the frame 13 tightly against the side stiles of the window frame 10 to securely hold the screen in place. It will also be apparent that the retaining means compensates for adjustment of the parts of both frames 13 and 42 to meet variations in sizes of different window frames. Bracing means is arranged between the sections 43 and sections 44 of the frame structure 42. The said bracing means consists of a rod 52 of telescopic sections held in adjusted relation by a set screw 5, and loops 53 respectively on opposite sides of the rod and slidable on the corresponding sections 43 and 44. Each loop 53 is split and has cooperative threaded portions 54 which screw into the related end of the rod 52.

Suitable filling or screening material is used to fill the spaces at opposite sides and the top and bottom of the box-like formation presented by the frames 13 and 42. This filling or screening material 55 is shown most clearly in Figure 11. The material 55 has hems 56 on the upper and lower edges thereof which accommodate the sections 26 of the upper and lower rods 25, and also has divided hems 57 which accommodate the L-shaped sections 43 and 44 of the frame structure 42. The side edges of the material 55 have securing means in the form of tying strips or tapes 58 which are tied around the rods 25 on the side members of the frame 13. The material 55 has securing means in the form of tying strips or tapes 59 to be tied around the brace rods 52 constituting parts of the frame structure 42. The strips or tapes 59 also compensate for variations in the width of the frame structure by taking up any slack or fullness. Due to the flexibility of the flanges 23, the edges 24 thereof may be made to clamp the material 55, by tightening the units 28 on the bolts 27. It will therefore be understood that the material 55 may be readily separated for cleaning, repairing or replacement. It is also obvious that the box-like formation which the material 55 assumes when applied allows the sashes 11 to be swung on their pivots to open positions, and also allows air to enter from the top, bottom and sides into the window opening for ventilating purposes while excluding insects.

The base frame structure 13 of the screen shown in Figures 1 to 6, inclusive, may be permanently secured to the window frame, instead of being secured by the retaining means consisting of the features 30 to 41, inclusive. This will be accomplished as illustrated in Figures 7, 8 and 9. The sections 14 and 15 of the side members of the base frame assembly will be secured to the side stiles of the window frame 10 by screws or the like 60; such sections being provided with holes to receive the same. In order to connect the sections 20 and 21 of the top and bottom frame members to the sections 14 and 15 of the side members thereof, use is made of means presently to be described for each of the top and bottom frame members. A hollow hub 61 is provided for each of the sections 20 and 21 and is secured to the corresponding section 14 or 15 by the screw 51 and screws 62 in lieu of the screws 50, the screws 62 being longer than the screws 50 so as to thread into the tapped holes 63 in the hub 61; the screw 51 being threaded in a tapped hole 64 in the hub. The hub 61 has a keyhole slot 65 which receives a headed stud or pin 66 on one end of a flat spring 67 whose opposite end is secured as at 68 to the corresponding section 20 or 21 as the case may be. Each of the sections 20 and 21 has a longitudinal slot 69 to allow outward flexing of the related spring 67, so that the pin 66 may be engaged in the slot 69 after which the particular section 20 or 21 is turned to bring the pin 66 in the restricted portion of the slot 69. In other respects the screen is similar to that shown in Figures 1 to 6, inclusive, and corresponding parts are designated by similar reference numerals.

The base frame assembly 13 without the frame structure 42 may be secured to a window frame having slidable sashes as illustrated in Figures 15 and 16. It is to be understood that the retaining means consisting of the features 30 to 41, inclusive, may be used or the same may be omitted and the assembly 13 held in place permanently by screws or the like as shown in Figure 8. In the application of the base frame assembly 13 as shown in Figure 15, the top and bottom frame members are disposed so that the slots or grooves will be in the plane of the side members of the assembly. In this case use will be made of screening or filling material, as shown in Figure 18, consisting of two substantially similar sections 70. Each of these sections 70 has a hem 71 extending continuously along one of its side edges and has a hem 72 extending continuously along the upper and lower edges thereof. It will therefore be understood that the sections 70 are relatively adjustable to compensate for variations in the widths of various window frame openings. The hems 71 and 72 of the sections 70 receive the rods 25 arranged within the members of the frame assembly 13. The screen or filling material consisting of the sections 70 provides an opening at the overlapped portions of the sections so that a person may reach through the opening to raise or lower the sliding sashes 73 of the window frame 74, in cases where the screen is applied to the inside of the window frame.

In Figures 12, 13 and 14 there is shown a modified form of frame consisting of similar top and bottom members 75 and similar side members 76. Each of the top and bottom members 75 consists of an intermediate tubular section 77, an end section 78 which is slidably fitted in one end of the section 77, and an end section 79 which is secured to the other end of the section 77. The section 77 has series of holes 80 and 81 similarly spaced and arranged diametrically opposite each other. A female screw or the like 82 is received in any one of the holes 80, and a screw 83 which threads into the screw 82 is received in any one of the holes 81. A coil expansion spring 84 is arranged within the section 77 and has one of its ends connected with the section 78 as at 85, and its opposite end is connected by a loop 86 with the screw 82. The spring 84 constantly urges the section 78 outward of the section 77. Each of the side members 76 consists of telescopic sections 87 and 88, the latter being of tubiform construction and having a longitudinal slot 89. The section 87 is also of tubiform construction but may be of solid construction.

The upper ends of the sections 87 are secured respectively to the sections 78 and 79 of the top member 75 by screws or the like 90, and the lower ends of the sections 88 are similarly secured respectively to the sections 78 and 79 of the lower member 75. It will be understood that a frame consisting of the members 75 and 76 will be adjustable as to length and width to fit various sized window frames, and that said frame will be held in place by the tension of the springs 84. Top and bottom members 75, and the sections 87 of the side members support the screening or filling material made in sections with the hems as shown in Figure 18. In cases where the screen is used principally for ventilating purposes, and therefore of comparatively low height, the screening material may be of one piece with a hem made on each of its four edges.

If desired, means 92 shown in Fig. 19 consisting of telescoping sections 93 having swiveled nuts 94 may be used in conjunction with the base frame assembly 13, or the frame structure shown in Figure 12, to support curtains or draperies on the inside of a window frame.

I claim:

1. A screen comprising vertical and horizontal rods, suitable screen material secured to said rods, and an outer frame made of hollow members within which said rods are secured respectively, said frame being slotted to accommodate said material, the provision and arrangement being such that said material will fill said frame.

2. A screen comprising a frame of box-like formation, a structure made of suitable screen material which conforms to three sides and the top and bottom of said frame, and means on said structure for detachably attaching the structure to said frame.

3. A screen comprising a frame of box-like formation, a structure made of suitable screen material which conforms to three sides and the top and bottom of said frame, and means on said structure for detachably attaching the structure to said frame, said means including hems on said structure which receive therein sections of said frame.

4. A screen comprising a frame of box-like formation, a structure made of suitable screen material which conforms to three sides and the top and bottom of said frame, and means on the edges of said structure for detachably attaching the structure to certain sections of said frame.

5. A screen comprising a frame consisting of side members and top and bottom members, means connecting the ends of the side members with the corresponding ends of the top and bottom members, each of said members being of hollow construction and consisting of sections longitudinally adjustable with respect to each other and further constructed to provide a slot, rods arranged respectively within said members, each of said rods consisting of sections longitudinally adjustable with respect to each other, means to secure the rod sections respectively to the frame member sections so as to be adjustable therewith, and filling material extending into said slot and secured to said rods to fill in said frame.

6. A screen comprising a frame structure of box-like formation consisting of a base frame consisting of hollow side members and top and bottom members, and means detachably connecting the ends respectively of the top and bottom members to the corresponding ends of said side members; top and bottom members of substantially U-shape, means detachably connecting the U-shape members to said base frame, rods arranged respectively within said side and top and bottom members of the base frame, filling material formed into a box-like structure, said base frame members being slotted to accommodate said material, means to attach the edges of said material to said rods, and means on said material to engage the U-shape members to sustain the filling material in box-like formation.

7. A screen as defined in claim 6 in which the frame members, the rods, and the supports consist of sections longitudinally adjustable with respect to each other to vary the size of the screen.

8. A screen as defined in claim 6 in which means is operatively arranged on the base frame and adapted to exert outward pressure independently of said frame to retain the screen in place on a window frame in relation to the opening therein.

9. A screen comprising an outer frame made of slotted telescopic hollow members, rods each consisting of longitudinally adjustable sections secured within said members respectively, filling material extending into said members by reason of the slots therein and said material being secured to said rods and thus filling said frame.

10. A screen comprising an outer frame made of slotted telescopic hollow members, rods each consisting of longitudinally adjustable sections secured within said members, respectively, filling material extending into said members by reason of the slots therein and said material being secured to said rods and thus filling said frame, and expansible retaining means carried by said outer frame to retain said structure in place on a window frame in relation to the opening therein.

11. A window screen comprising a frame structure of box-like formation and consisting of interconnected vertical and horizontal members, suitable screen material applied to said structure to span all but one of the spaces between said members, and means carried by said structure adapted to exert outward pressure independently of said structure to retain the screen in place on a window frame in relation to the opening therein.

12. A window screen comprising a frame structure of box-like formation and consisting of interconnected vertical and horizontal members, suitable screen material, applied to said structure to span all but one of the spaces between said members, and means carried by certain of said horizontal members adapted to exert outward pressure independently of said horizontal members to retain the screen in place on a window frame in relation to the opening therein.

13. A screen comprising an outer frame made of slotted hollow members of flexible metal, rods secured within said members, filling material extending into said members by reason of the slots therein and said material being secured to said rods and thus filling said frame, and means carried by said members to clamp the latter in engagement with said material.

14. A screen including a frame consisting of channel side members and top and bottom members, and means detachably connecting the ends respectively of the top and bottom members to the corresponding ends of said side members, said means consisting of stubs secured to the side members, each of said stubs having a keyhole slot therein, and spring members on said top and bottom members and each having a pin, the ends of each of the top and bottom members respectively receiving a pair of said stubs and the pins being engageable respectively in the slots in said pair of stubs.

15. A device for supporting screen or analogous material comprising the combination of a substantially U-shaped member and a screw-threaded coupler rotatably mounted on each end of said member.

16. The combination with an adjustable window screen frame including hollow telescopic sections; of a device extending within said sections for retaining the frame in place on a window frame, said device consisting of tubiform telescopic sections, a slidable end member carried by one of said last sections, and an expansion spring having one of its ends connected with said last section and its other end connected with said end member.

17. The combination with an adjustable window screen frame including hollow telescopic sections; of a device extending within said sections for retaining the frame in place on a window frame, said device consisting of tubiform telescopic sections, a slidable end member carried by one of said last sections, an expansion spring having one end connected with said end member, and means adjustable on said section in which the end member is disposed, connected with the remaining end of the spring.

18. The combination with a screen, of a device carried by the screen and adapted to exert outward pressure for holding it in place, said device including an end member, a second member in relation to which said end member slides, an expansion spring having one end connected with said end member, and means connecting the remaining end of the spring with said second member, said means consisting of a securing element, said second member having a plurality of spaced holes therein so that the position of the element may be changed to vary the compression of the spring.

JOSEPH BREWER.